United States Patent [19]

Wilson

[11] 4,249,974
[45] Feb. 10, 1981

[54] METHOD FOR RETICULATING AN ADHESIVE TO CONFORM TO A SURFACE OF AN APERTURED WORKPIECE

[75] Inventor: Paul H. Wilson, Seattle, Wash.

[73] Assignee: The Boeing Company, Seattle, Wash.

[21] Appl. No.: 936,342

[22] Filed: Aug. 24, 1978

Related U.S. Application Data

[63] Continuation of Ser. No. 769,397, Feb. 16, 1977, abandoned, which is a continuation of Ser. No. 544,239, Jan. 27, 1975, abandoned.

[51] Int. Cl.³ .................... B32B 3/12; B32B 31/16; B32B 31/26
[52] U.S. Cl. .................... 156/85; 156/197; 156/252; 156/285; 156/308.4; 156/309.6; 156/330; 156/331
[58] Field of Search .............. 156/178, 197, 252, 497, 156/285, 85, 308.4, 309.6, 330, 331

[56] References Cited

U.S. PATENT DOCUMENTS

| | | | |
|---|---|---|---|
| 3,656,992 | 4/1972 | Lynam et al. | 156/197 |
| 3,734,812 | 5/1973 | Yazawa | 156/178 |
| 3,793,115 | 2/1974 | Jindra | 156/497 |
| 3,979,494 | 9/1976 | Ericson | 156/252 |
| 4,045,267 | 8/1977 | Davis et al. | 156/197 |

OTHER PUBLICATIONS

Schmidt, *Principles of High-Polymer Theory and Practice*, McGraw-Hill Book Co., Inc., New York, N.Y. (1948), pp. 180-189, 256.

*Primary Examiner*—Jerome W. Massie
*Attorney, Agent, or Firm*—Christensen, O'Connor, Johnson & Kindness

[57] ABSTRACT

A adhesive sheet or film placed in contact with a surface network formed by the edges of the cell walls of a honeycomb core panel is reticulated and conformed to the shape of the surface network to form a bead of adhesive on the surface network and the contiguous portions of the cell walls without depositing excess adhesive onto the interior cell walls. A method for reticulating the adhesive includes the steps of (a) contacting the surface network of a honeycomb core panel with a continuous film of adhesive material, (b) heating the film overlying at least a portion of the surface network to cause the heated portion of the adhesive film to adhere to the surface network and to reduce the cohesive strength of the heated portion of the adhesive film covering the honeycomb cells, and (c) thereafter injecting a pressurized gas through the cells of the honeycomb core toward the heated portion of the adhesive film, causing the heated portion of the film covering each of the honeycomb cells to distend outwardly away from the surface of the honeycomb core and to rupture. The surface tension of the heated adhesive film causes the ruptured portions of the film to contract toward the surface network leaving a bead of adhesive covering the surface network and the portion of the honeycomb cell walls contiguous to the surface network.

11 Claims, 9 Drawing Figures

METHOD FOR RETICULATING AN ADHESIVE TO CONFORM TO A SURFACE OF AN APERTURED WORKPIECE

This is a continuation of application Ser. No. 769,397, filed Feb. 16, 1977, now abandoned, which in turn is a continuation of application Ser. No. 544,239, filed on Jan. 27, 1975, now abandoned.

BACKGROUND OF THE INVENTION

The present invention relates to a method and an apparatus for applying adhesives to a surface, and more particularly, to a method and apparatus for reticulating an adhesive film to conform to a surface having a plurality of apertures therein, and most particularly, to a method and apparatus for reticulating an adhesive film to conform to the surface network formed by the edges of the cell walls of a honeycomb core.

A variety of methods and apparatus are employed in the prior art for applying adhesives to the surface network of a honeycomb core so that a surface or facing panel can be adhesively secured to the surface network of a honeycomb core to form one wall of a honeycomb panel. Such panels are employed in acoustical and structural applications. Among the methods presently used to apply an adhesive to a honeycomb core is one in which the edges of the honeycomb core are precoated with an adhesive prior to expanding the cells into a honeycomb network. This method is satisfactory for some uses, but for other uses does not allow a sufficient amount of adhesive to be applied, does not effect a uniform application of adhesive over the honeycomb core, and does not allow a bead of adhesive to be applied that extends over the edge of the walls of the honeycomb cells and down a very small distance onto the contiguous portion of the walls of the cells. Another method presently employed in the art is to apply the adhesive to the edges of a honeycomb core with an adhesive coated roller that is brought into rolling contact across the surface network of the core. This method is subject to the same disadvantages as adhesive application prior to expansion of the honeycomb cells, but in addition deposits an excess amount of adhesive onto the interior walls of the honeycomb cells.

Another method presently employed in the art for applying adhesives to the edge network of a honeycomb core is to overlay the surface network of a honeycomb core with a relatively thin sheet of thermosetting adhesive and thereafter to direct a hot airstream downwardly toward the surface of the adhesive causing the adhesive to shear or burst where it is unsupported by the surface network. This method, however, also deposits an excess amount of adhesive onto the interior walls of the honeycomb cells while leaving an insufficient amount of adhesive in the form of a bead on the surface network of the core.

Accordingly, it is a broad object of the present invention to provide a method and apparatus for applying an adhesive material to the surface of an article having a plurality of apertures therein and reticulating the adhesive to conform to the surface of the article, and more particularly, to provide a method and apparatus for reticulating an adhesive film to conform to the surface network of a honeycomb core. Additional objects of the present invention are to reduce the amount of adhesive required to form an adequate bead of adhesive on the surface of an apertured article adjacent the periphery of the apertures, and to form a bead that extends from the surface of the apertured article down a very small distance onto the interior walls of the apertures, so that, when a facing panel is contacted with the adhesively coated surface of the article, a small fillet of adhesive is formed between the interior surface of the facing panel and the interior walls of the apertures. It is a further object of the present invention to provide a method and apparatus for reticulating an adhesive onto the apertured surface of such an article so that an adequate bead is formed for bonding purposes, while requiring a lesser amount of adhesive than required by the prior art processes. It is a further object of the present invention to provide a method and apparatus whereby an adhesive film can be layed over the apertured surface of an article and thereafter reticulated to conform to the surface structure of the apertured article without depositing excess adhesive on the interior walls of the aperture. It is a further object of the present invention to provide a method and apparatus whereby a thin film of adhesive can be placed over the surface network of a honeycomb core and thereafter reticulated to expose the interior of the honeycomb cells, while forming a bead of adhesive on the edges of the honeycomb cells that extends a small distance into the cells along the cell walls contiguous the edges of the cell walls. It is a further object of the present invention to provide a method and apparatus that can be used to apply adhesives having improved strength and/or higher temperature resistance properties that could not be applied by prior art methods and apparatus. It is a further object of the present invention to provide a method and apparatus that can be employed with a wide range of adhesive compositions having a wide variety of melting and curing temperatures.

SUMMARY OF THE INVENTION

The foregoing objects, and other objects that will become apparent to those of ordinary skill upon reading the following specification are realized in the method and apparatus of the present invention. Broadly, the method reticulates an adhesive film to form an adhesive bead that covers the surface of a workpiece surrounding an aperture in the workpiece and the walls of the aperture contiguous to the surface of the workpiece. The method includes the steps of (a) placing a film of adhesive on the apertured surface of the workpiece so as to cover the aperture and contact the surface of the workpiece surrounding the aperture, (b) causing the film to at least partially adhere to the surface of the workpiece surrounding the aperture, and (c) exerting a fluid pressure within said aperture, as by injecting a fluid into the aperture, so as to cause the portion of the film covering the aperture to distend away from the surface and to rupture. In the preferred embodiment the adhesive film comprises an uncured, thermosetting adhesive resin that when heated becomes tacky and loses at least some of its cohesive strength. As the temperature of the thermosetting adhesive is raised, the adhesive will adhere to the surface of the workpiece and will lose cohesive strength causing that part of the adhesive film covering the aperture to sag. As the fluid stream is injected into the aperture, the portion of the adhesive film covering the aperture is caused to extend outwardly from the surface of the workpiece and form a bubble. As the fluid stream continues to be injected into the aperture, the bubble is caused to distend further and to rupture. The surface tension of the preferred adhesive is sufficient to cause the film forming the ruptured bubble to contract toward the edge of the aperture and to form a bead of adhesive around the periphery of the aperture.

In another aspect the present invention provides an apparatus for performing the foregoing method comprising a means for supporting a workpiece having an aperture therein, a means for heating an adhesive film overlying the apertured surface of the workpiece, and a means for injecting a fluid stream into the aperture to cause the portion of the adhesive film overlying an aperture to distend upwardly and rupture. In its preferred embodiment, the apparatus is designed for reticulating an adhesive to conform to the surface network of a honeycomb core. In this embodiment the honeycomb panel is supported for movement in a first direction so that a portion of the panel is oriented substantially horizontally along its dimension transverse to the direction of travel of the panel and so that the cells of the honeycomb core lying in the horizontally oriented portion of the core are oriented generally vertically. The heating means is positioned above the path of travel of the core to heat the adhesive film covering the core as the core travels under the heating means. The fluid injecting means is positioned below the path of travel of the panel and is offset in the direction of travel of the panel from the heating means. As the horizontally oriented portion of the core travels over the fluid injecting means, a stream of fluid enters the honeycomb cells from the bottom and bears against the bottom surface of the film covering the cells, causing the adhesive film to distend outwardly from the cells and to rupture. Thereafter the ruptured film contracts to form a bead over the surface network of the core.

BRIEF DESCRIPTION OF THE DRAWINGS

A better understanding of the present invention can be derived by reading the ensuing specification in conjunction with the accompanying drawings wherein.

DESCRIPTION OF PREFERRED EMBODIMENTS

In accordance with the present invention, an adhesive sheet or film is reticulated so as to conform to the surface structure of an article having one or more apertures extending into the article from the surface. As used herein, reticulation is the dividing or severing of a sheet of adhesive material so as to apply adhesive to the surface structure of an apertured article while leaving open the aperture or apertures in the surface of the article. Although the method and apparatus of the present invention is described in relation to its preferred use for reticulating a thin film of adhesive onto the surface network of a honeycomb core employed in the manufacture of structural and acoustical panels, the method and apparatus can be employed for reticulating an adhesive film on the surface of any article containing apertures through which a stream of fluid can be directed such that the fluid stream flows outwardly or away from the surface onto which the adhesive film has been applied. For example, the process and apparatus of the present invention can be used to reticulate an adhesive film onto the surface of a plate having a plurality of bores or orifices extending through the plate from its surface. The process and apparatus of the invention can be employed to reticulate an adhesive to a uniform, repetitive, surface network such as occurs in a honeycomb core or can be employed to reticulate an adhesive film onto the surface of an article having a random array of apertures.

Adhesive compositions that can be successfully employed in accordance with the present invention are commercially available in thin films or sheets in a variety of thicknesses, widths, and lengths. Examples of such adhesives are the high bonding strength, thermosetting resins, such as the modified block copolymer epoxy and polyimide resins. Such epoxy resins are normally cured to bonding strength at temperatures on the order of 250° F. to 350° F. Such polyimide resins are normally cured to bonding strength at temperatures on the order of 350° F. and are often subject to post-curing heat treatment at temperatures on the order of 500° F. to 600° F. Other resin chemistries can also be employed with the present invention so long as the resins have the characteristic physical properties set forth below.

Two exemplary resin compositions available in sheet form that have been found satisfactory for use with process and apparatus of the present invention are the epoxy resins sold under the product designation PL-729-300 by the B. F. Goodrich Chemical Company, Akron, Ohio and the product designation AF-453 by the 3M Company, St. Paul, Minnesota. These adhesives are conventionally sold in an uncured form for application and curing by the user. These adhesives can be cured to bonding strength by conventional heat curing techniques which heated to their curing temperature of on the order of 350° F. The adhesives are sold in sheet form in weights on the order of 0.03 lbs. per square foot up to 0.12 lbs. per square foot or greater. Prior art application techniques require the heavier adhesive films, on the order of 0.08 lbs. per square foot up to or exceeding 0.12 lbs. per square foot. A major advantage of the present invention is that adhesive having a weight on the order of 0.02 to 0.03 lbs. per square foot applied in accordance with this invention will have bond strengths equivalent to adhesives having a weight on the order of 0.08 lbs. per square foot and up. The preferred adhesives in the weight range of 0.02 to 0.03 lbs. per square foot have a film thickness on the order of 0.005".

The exact compositional makeup and molecular weight of these exemplary adhesive films are proprietary to the manufacturers and consequently are unavailable for disclosure. However, adhesive films such as those set forth above and a variety of other film chemistries having similar physical properties can be reticulated in accordance with the present invention. The important physical characteristics of any film to be used in the present invention are: (1) that the film be relatively flexible so that it can be handled and applied to a surface at or near room temperature; (2) that the film has sufficient cohesive strength to support its own weight against gravity at room temperature over relatively small apertures such as those formed by individual honeycomb cells; (3) that, when the film is heated to a temperature above room temperature but below its curing temperature, it will begin to lose its cohesive strength, i.e., the rheology of the film begins to transition toward a semi-liquid state at which it begins to lose its self-supporting capability over relatively small apertures such as those formed by honeycomb cells; (4) that preferably the film becomes sufficiently tacky when heated to a temperature below its curing temperature so that it will adhere to a surface that it is contacting with a strength that is greater than its cohesive strength at the temperature to which it has been heated, and (5) that the film be homogeneous and have a substantially uniform thickness so that, when it is heated and subjected to pressure from within an aperture over which it is lying, the portion of the film overlying the aperture will distend, form a bubble having a substantially uniform wall thickness, will burst, and will recede or contract to form a uniform bead of adhesive adjacent the edges of the aperture. With regard to the third characteristic set forth above, if the particular adhesive film chosen for use in the present invention begins to lose its cohesive strength at a lesser temperature than that at which it becomes tacky, the film can be precoated with a very thin layer of a second adhesive composition that will cause the adhesive film to adhere to the surface it is contacting.

Figures 1A, 1B, 1C, 1D:
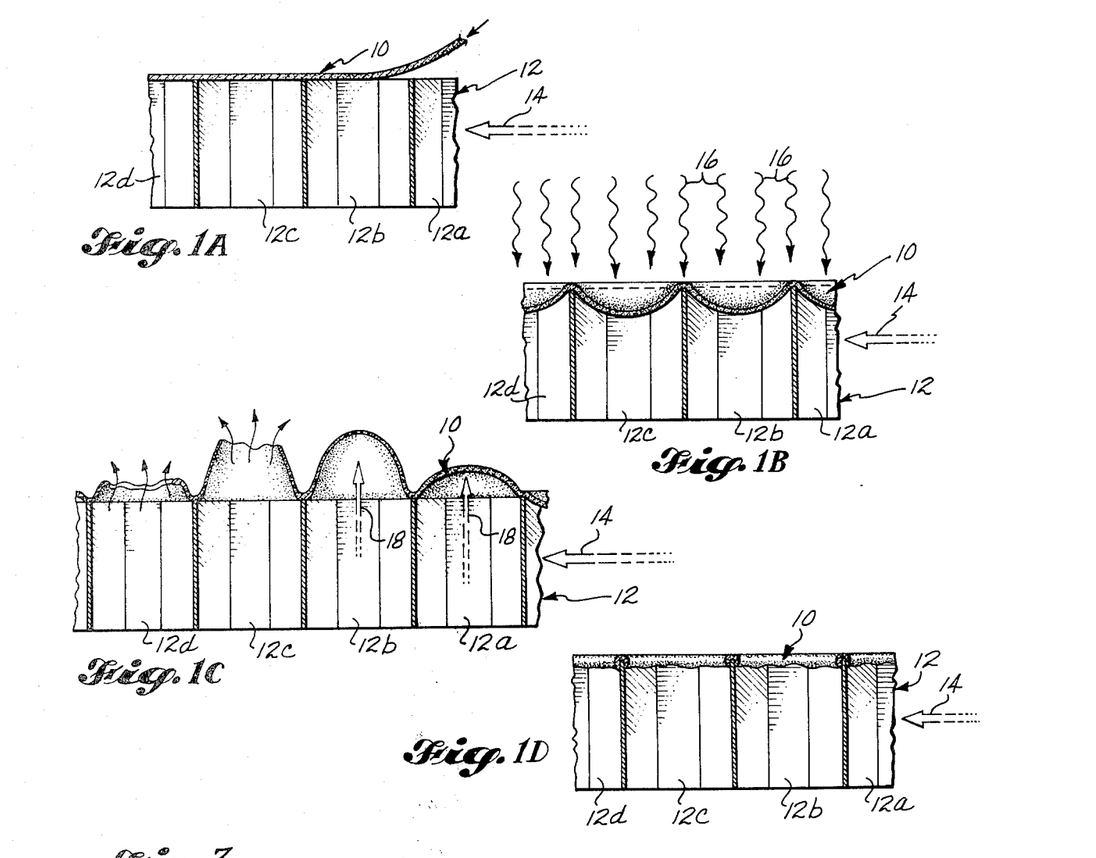
FIGS. 1A, 1B, 1C and 1D are illustrations of a honeycomb core showing sequentially the several stages by which an adhesive film is applied to and reticulated on the surface network of a honeycomb core in accordance with the method of the present invention.

Referring now to FIGS. 1A through 1D, a film of adhesive 10 is overlaid on the exposed upper surface network of a honeycomb core 12. As shown, the honeycomb core comprises a plurality of hexagonal honeycomb cells 12a, 12b, 12c and 12d bounded by cell walls. The honeycomb core 12 is shown in section so that the cells 12a through 12d are bisected along their longitudinal dimension. The walls of the honeycomb cells 12a through 12d terminate in upper edge surfaces, which when viewed from the top, divide the upper surface of the honeycomb core into a network of hexagonally shaped apertures separated by the upwardly facing edge surfaces of the cell walls. It is this surface network onto which the adhesive film 10 is overlaid. After the adhesive film is overlaid on the surface network as shown in FIG. 1A, all of the openings to the honeycomb cells on the upper surface of the honeycomb core 12 are closed or covered by the adhesive film 10. As illustrated, the adhesive film 10, supplied from a suitable source (not shown), is overlaid on the upwardly facing edge surfaces of the cell walls as the honeycomb core 12 is moved from right to left as indicated by the arrow 14.

After the adhesive sheet 10 has been overlaid on the surface network of the honeycomb core 12, the core is passed in the direction of arrow 14 under a source of thermal radiation, schematically illustrated by the sinuous arrows designated 16 in FIG. 1B. The thermal radiation source can be any suitable heat generating device such as an infra-red lamp. The thermal radiation source is arranged so as to cover a band of the overlying adhesive film that extends across the honeycomb core along a dimension transverse to the direction of travel of the core. As the uncured adhesive sheet is heated, its cohesive strength is reduced, causing it to sag into the honeycomb cells 12a through 12d. It is to be understood that the longitudinal dimension or upright dimension of the cells 12a through 12d are preferably oriented so that gravity will cause the adhesive film over the cell openings to sag downwardly from the surface network of the honeycomb core into the interior of the cells. As the adhesive film is heated it also becomes tacky causing it to adhere to the edge surfaces of the honeycomb cell walls. Care must be taken not to heat the adhesive sheet to too high a temperature. If the adhesive is overheated to a temperature too near its liquid state, it will lose substantially all of its inherent cohesive strength, undesirably allowing the adhesive sheet to part and drip down the interior surfaces of the cell walls, to prematurely reticulate and form uneven beads on the surface network.

A convenient indication that the adhesive film is ready for the next processing step occurs when the adhesive film begins to very slightly sag into the cells. The characteristic temperatures to which various adhesive films must be heated to cause them to sag will vary according to the particular chemistry of the adhesive, and the thickness of the film. The characteristic sag temperature of the 3M Co. AF-453 adhesive film (0.03 lbs. per square foot) is on the order of 240° F. Heating the 3M adhesive to a temperature in the range of 230° F. to 270° F. will yield a satisfactory sag in the adhesive film. Likewise, the characteristic sag temperature for the B. F. Goodrich Chemical Company adhesive (0.03 lbs. per square foot), is on the order of 250° F. Heating the B. F. Goodrich adhesive to a temperature within the range of from 250° to 270° F. will be adequate to cause a satisfactory sag in the adhesive film. At the same time, heating the adhesive films to these temperatures will cause them to become sufficiently tacky to adhere to the outwardly facing edge surfaces of the honeycomb cell walls.

When the adhesive film is heated to its characteristic sag temperature, the honeycomb core 12 is moved in the direction of the arrow 14 relative to the location of the source of thermal radiation to a station where an upwardly directed airstream is injected into the bottom openings of the honeycomb cells 12a through 12d, as illustrated in FIG. 1C. For purposes of the invention it is necessary that the airstream be directed such that it blows in a direction outwardly from the aperture, in the case of the preferred embodiment, in a direction outwardly from the surface network on which the adhesive sheet lies. The airstream represented by arrow 18 in cell 12a first causes the sagging adhesive film covering the opening in cell 12a to reverse its direction of curvature and to distend outwardly from the surface network and form a dome-shaped bubble. Because the adhesive film has been heated to its characteristic sag temperature, and because it has also become tacky, the edges or ends of the bubble will adhere to the outwardly facing edge surfaces of the walls of the honeycomb cell 12a. As the airstream continues to exert force on the bubble, the bubble distends further outwardly from the surface network as shown in relation to cell 12b, reducing the thickness of the film, especially in the center of the dome-shaped bubble. As the airstream continues to exert force on the bubble, the bubble will ultimately burst without pulling the film or adhesive away from the outwardly facing edge surfaces of the cell walls, as illustrated in relation to cell 12c. The airstream can then pass through the ruptured portion of the bubble. As the airstream continues to blow through the ruptured bubble, as shown in relation to cell 12d, the surface tension in the adhesive film will cause the edges of the bubble to rapidly recede or contract toward the outwardly facing edge surfaces of the cell. This retraction process continues while the airstream holds the remaining portion of the bubble in an upward and outward orientation until the surface tension in the adhesive film draws all of the bubble back to the surface network.

When the bubble has completely retracted to the surface as shown in FIG. 1D, the adhesive sheet is reticulated onto the surface network of the core, forming a bead of adhesive of finite thickness that covers the outwardly facing edge surfaces of the cell wall and extends downwardly from the edge surfaces onto the contiguous interior surfaces of the cell wall. The core is now ready for placement of a structural facing sheet over the surface network of the core 12. When the facing sheet is positioned on the core and the temperature of the adhesive is raised to its curing temperature, the beads of adhesive will adhere to the facing sheet and will form a uniform adhesive fillet between the downwardly or inwardly facing surface of the facing sheet and the contiguous interior surfaces of the cell walls, thus providing an excellent distribution of adhesive between the honeycomb core and the inwardly facing surface of the cover sheet. This last step is not illustrated, as it is a conventional processing step that is carried on subsequent to reticulating the adhesive on the surface network of the honeycomb core.

The temperature of the stream of hot air that is injected through the apertures formed by the honeycomb cells so as to distend the film into its bubble forming and rupturing sequence will vary depending upon the adhesive, chemistry and other physical parameters of the system. For example, a preferred air temperature for the exemplary B. F. Goodrich adhesive is on the order of from 240° F. to 270° F. A preferred air temperature for the exemplary 3M Co. adhesive is on the order of from 230° F. to 260° F. The velocity of the airstream injected through the cells and outwardly from the apertured surface of the honeycomb core will vary depending upon the weight (or thickness) of the adhesive sheet, the temperature to which the adhesive sheet has been heated, and the thickness and contour of the honeycomb core, which may cause heat loss when the airstream passes through the core. For the preferred temperatures stated above for the B. F. Goodrich and 3M adhesives, the preferred air velocity is created by providing air at a pressure of 5 p.s.i.g. to a plenum that in turn supplies the elongate nozzle, described below, having an aperture width of 0.015 inches.

For acoustic applications, it may be desired to reticulate an adhesive to the surface network of a honeycomb core on only one side or surface of the core. It is of course within the purview of the present invention to reticulate an adhesive to the surface network or both sides of a honeycomb core. To accomplish this in the context of the sequential illustrations of FIGS. 1A through 1D, the process of reticulating the adhesive film would be repeated by first inverting the honeycomb core 12 illustrated in FIG. 1D and sequentially performing the same successive steps described in conjunction with FIGS. 1A through 1D, namely, applying an adhesive film to the opposite surface network of the honeycomb core 12 (FIG. 1A), heating the adhesive film to its characteristic sag temperature (FIG. 1B), injecting an airstream so as to distend the sagging adhesive film outwardly from the opposite surface of the honeycomb core 12 and to rupture the bubbles formed over each of the honeycomb cells (FIG. 1C), so that the adhesive film retracts into a bead covering the outwardly facing edge surfaces of the cell walls and the contiguous interior surfaces of the cell walls (FIG. 1D).

Figure 2:
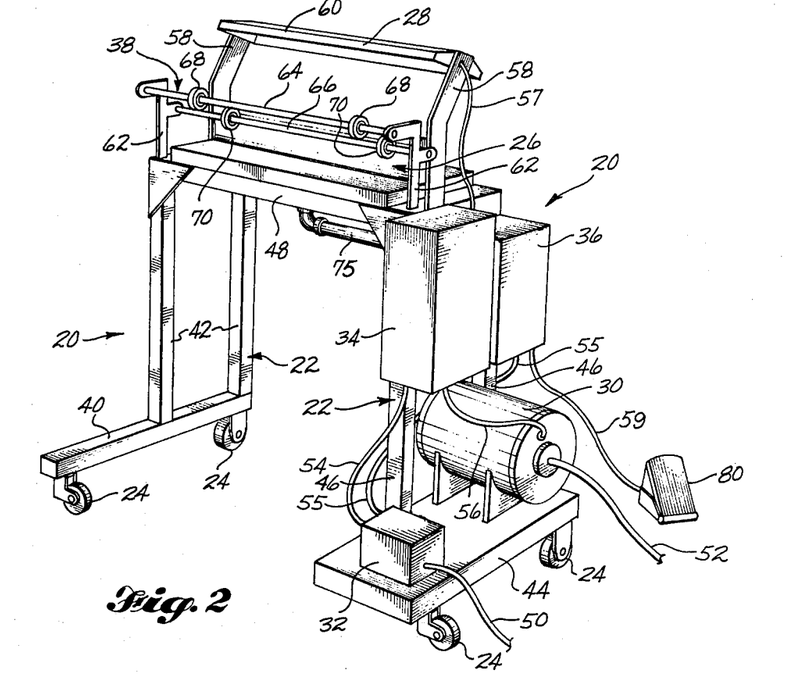
FIG. 2 is an isometric view of an adhesive reticulating apparatus constructed in accordance with the present invention.
Figure 3:
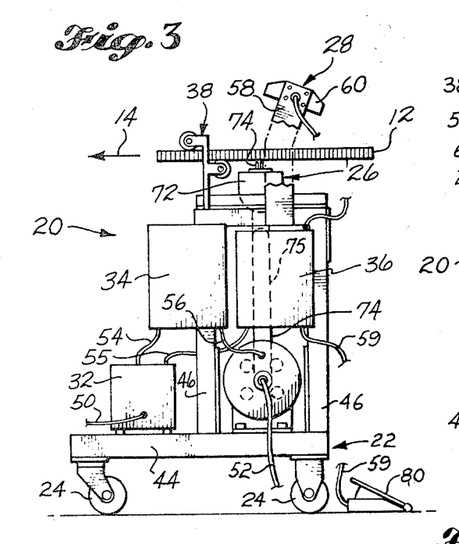
FIGS. 3 and 4 are side elevation and end elevation views, respectively, of the adhesive reticulating apparatus illustrated in FIG. 2.
Figure 4:
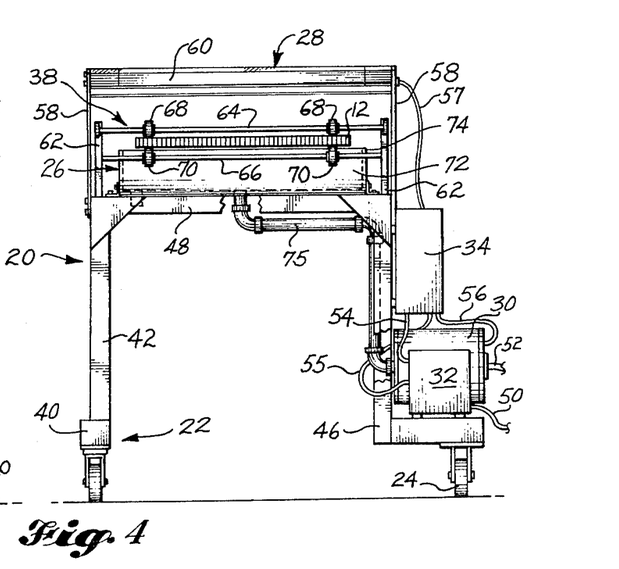

The subsequent FIGURES illustrate a portable adhesive recticulator 20 for reticulating an adhesive film on the surface network of a honeycomb core. Referring to FIGS. 2, 3 and 4, the reticulator 20 comprises a frame assembly 22 mounted on casters 24 for portability, an air knife assembly 26, an infra-red heat lamp 28, an air heater 30, a power input supply 32, an air heater controller 34, a heat lamp controller 36 and a honeycomb support roller assembly 38. The frame 22 generally has an inverted U-shape having a first horizontally extending bottom bar 40 into which a suitably spaced pair of casters 24 are secured. The first bottom bar 40 supports a first pair of vertically extending bars 42. A horizontal platform 44 is transversely spaced from the bottom bar 42 and forms the opposite bottom portion of the frame 22. A second suitably spaced pair of casters 24 are suitably secured to the bottom of the platform 44. The platform supports a second pair of vertically extending bars 46 that are transversely spaced from the first pair of bars 42. The vertically extending bars 42 and 46 extend upwardly to a suitable work height and are joined at their upper end by a transversely extending table 48.

The horizontal platform 44 supports the electrical power supply 32 and the air heater 30. The air heater 30 is a cylindrically-shaped container that holds several heating elements of the electrical resistance type. The air heating tank 30 is supplied with pressurized air from a source (not shown) via an air pressure hose 52. The power supply 32 is supplied with electrical energy from a suitable source (not shown) via a power input cable 50. The air heater controller 34 and the heat lamp controller 36 are hung above the platform 44 on the vertically extending bars 46. Electrical energy is supplied from the transformer 32 to the air heater controller 34 via a suitable electrical cable 54. The control energy for the heating elements in the air heater 30 is supplied from the controller via another suitable electrical cable 56. The infra-red heat lamp 28 is of the elongate type and is mounted on two upright bars 58 extending upwardly from the transversely spaced ends of the table 48. The lamp 28 comprises a suitable, elongated infra-red radiation generating bulb housed in a suitable reflector 60 that directs the infra-red energy downwardly toward the table 48. The reflector has its elongate dimension oriented transversely between the upright bars 58. Electrical energy is supplied from the transformer 32 to the lamp controller 36 via a suitable electrical cable 55 and hence to the lamp 28 via another suitable electrical cable 57. The flow of energy to the heating element is controlled via a foot-operated switch 80 suitably coupled to the controller 36 by an electrical cable 59.

The roller assembly 38 supports the honeycomb core 12 (shown in position on the reticulator in FIGS. 3 and 4) for traverse along a path situated over the table 48 in a direction transverse to the orientation of the elongate dimension of the heat lamp 28. The roller assembly 38 includes a pair of spaced frame members 62 extending upwardly from the ends of the table 48. A pair of parallel axles 64 and 66 extend between the upright frame members 62 above the table 48 and have their respective ends fixed to the upright frame members 62. Each of the axles 64 and 66 carry a transversely spaced pair of wheels 68 and 70 rotatably mounted thereon in suitable bearings. The first of the axles 64 is mounted above and is horizontally offset from the second axle 66 in the direction of travel of the honeycomb core. The wheels 66 and 70 are sized such that there is a vertical spacing between the lower periphery of the wheels 68 mounted on the upper axle 64 and the upper periphery of the wheels 70 mounted on the lower axle 66. This horizontal spacing is substantially identical to the thickness of the honeycomb core onto which an adhesive film is to be reticulated. The wheels are so positioned and oriented to support the workpiece in a cantilevered fashion over the transverse frame member 48 and under the infrared heat source 28. If desired the roller assembly can be constructed so as to be adjustable to support cores of varying thicknesses.

The air knife 26 is mounted on the table 48 at a position below the level at which the honeycomb core 12 is supported by the roller assembly 38. The air knife has an elongate nozzle 74 (to be described in greater detail later) having an opening located adjacent the underside of the honeycomb core 12 as it is supported over the table 48. The nozzle has an elongate dimension that is greater than the width of the honeycomb core and that is oriented transversely to the traverse path of the honeycomb core through this roller assembly. The nozzle 74 of the air knife is horizontally offset from the heat source 28 in the direction of traverse of the honeycomb core. Heated, pressurized air is supplied to the air knife from the air heater 30 via conduit 75.

Figure 5:
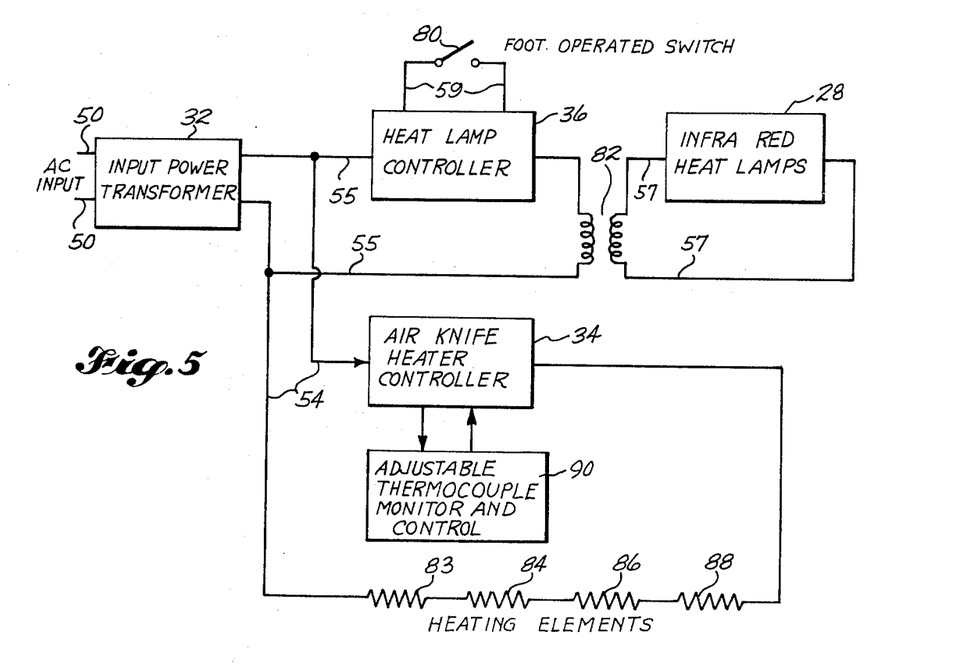
FIG. 5 is a simplified schematic diagram of the electrical system employed with the reticulating apparatus illustrated in FIG. 2.

Referring now to the electrical schematic diagram of FIG. 5, standard alternating current is supplied to a suitable power supply 32 via input lines 50. The output of the power supply is electrically connected to the infrared heat lamp controller 34 via lines 55 connected in series with a first winding of a second supply 82. The control circuit regulates the power input to the first winding of the supply 82, and is controlled itself by a switch 80, corresponding to the foot operated switch of the reticulator electrically coupled to the heat lamp controller by lines 59. The second winding of the supply 82 is electrically connected via lines 57 to the infrared heat lamps. By closing the switch 80, power is supplied to the supply 82, in turn inducing a suitable voltage and current in the heat lamp circuit.

The heating elements in the air heater 30 (FIG. 2) are schematically shown as series connected resistive elements 83, 84, 86 and 88 in FIG. 5. The resistive elements 83 through 88 are in turn electrically connected in series with a suitable voltage controller 34 and with the power transformer 32 via lines 54. The voltage controller 34 is electrically connected to a suitable temperature monitoring device 90 mounted in the airstream in the air knife 26 (FIG. 2). Any conventional temperature monitoring device such as a thermocouple suitably coupled to the voltage controller 34 can be employed. If desired, a thermostatic device can be incorporated into the monitor circuit so that a desired air temperature can be manually selected by the reticulator operator, enabling relatively precise automatic control over the temperature of the air stream issuing from the air knife.

Figure 6:
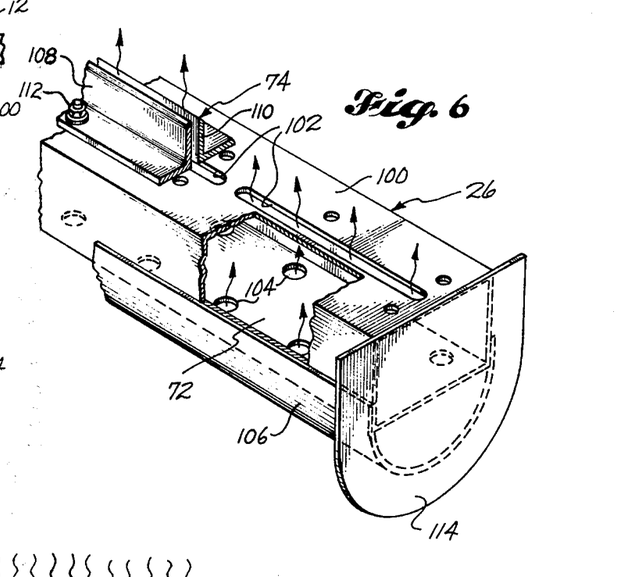
FIG. 6 is an enlarged, partially broken away, isometric view of the air knife assembly employed on the reticulating apparatus illustrated in FIG. 2.
Figure 7:
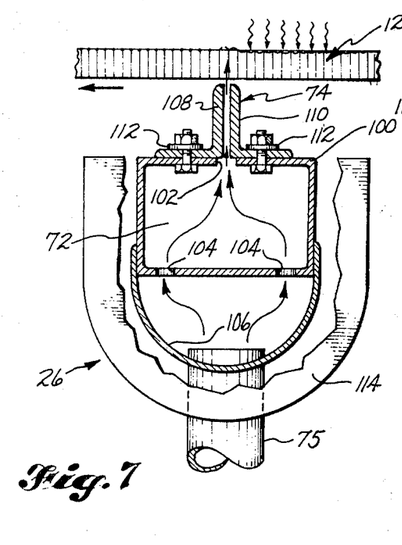
FIG. 7 is an enlarged, cross-sectional view of the air knife assembly illustrated in FIG. 6.

Referring now to FIGS. 6 and 7, the air knife 26 comprises a plenum generally designated 72 and a nozzle generally designated 74. The plenum 72 comprises an upper chamber formed by a hollow box beam 100 having a plurality of longitudinally aligned slots 102 formed in the upper web of the beam 100. The bottom web of the box beam 100 contains a plurality of cylindrical bores 104. The upper ends of a longitudinally extending wall member 106 having a U-shaped cross section are joined to the outside of the side webs of the box beam 100. The lower web of the box beam 100 serves as a dividing plate between the upper chamber and a lower chamber, formed between the U-shaped wall member 106 and the lower web of the box beam. Compressed air from the air heater 30 (FIG. 2) is fed via conduit 75 into the bottom chamber of the air knife, and travels into the upper chamber 72 via the bores 104 in the bottom web of the beam 100. The dual chamber arrangement tends to reduce the air turbulence below the slots 102 to provide an even pressure distribution throughout the upper chamber, especially adjacent the longitudinally aligned slots 102 in the upper web of the beam. End plates 114 cover both of the longitudinal ends of the box beam and elongated wall member 106. The elongated wall member 106 and the end plates 114 are joined to each other by conventional attachment techniques such as welding.

The nozzle 74 is formed by a pair of elongate L-shaped flanges positioned on the upper surface of the upper web of the box beam 100 adjacent the slots 102. The vertical arms of the L-shaped flanges 108 and 110 are spaced apart to form a longitudinally and upwardly extending slot that is vertically aligned with the slots 102 in the upper web of the beam. The horizontal arms of the L-shaped flanges are joined to the upper web of the beam by suitable fasteners 112 extending through mutually aligned bolt holes in both the horizontal arm of the flanges and the upper web of the box beam 100. The heated compressed air from the upper chamber enters the slots formed between the vertical arms of the L-shaped flanges 108 and 110. The upper edges of the L-shaped flanges 108 and 110 are positioned on the reticulator previously described so that the air stream exhausting from the opening between the flanges 108 and 110 is directed upwardly through the honeycomb cells from the bottom surface of the honeycomb core 12. The L-shaped flanges or angle irons 108 and 110 forming the nozzle 74 act as a restrictor which tends to confine the air within the upper and lower chambers of the plenum 72 while directing a thin sheet of hot, compressed air upwardly through the honeycomb core.

In operation of the reticulator to perform the method of the present invention, an adhesive film is first placed over the upper surface network of a honeycomb core. Thereafter a preselected, downstream and of the core is placed in the roller assembly 38 while the other, upstream end of the core is manually supported by the operator. In this manner, the core is located so that a portion of the core is located under the heat lamps 28 while a downstream portion of the core is located over the air knife. The air knife is then activated by energizing the heating elements in the air heater 30 and by initiating the flow of compressed air into the air heater. When the air issuing from the nozzle of the air knife has risen to the desired temperature, the infrared lamp is energized by depressing the foot switch. The thermal output of the lamp is chosen so that the adhesive film lying in the radiation path is quickly brought up to its characteristic sag temperature. As soon as the film has risen to its sag temperature, the core is manually forwarded across the airstream issuing from the air knife, causing the film to distend outwardly from the upper surface of the core and to rupture over the location of each of the honeycomb cells in accordance with the previous description. When the core is advanced, an unheated portion of the adhesive film overlying the surface network is brought within the radiation zone of the lamp, is heated to its sag temperature, and forwarded over the air knife. As stated, the infra-red lamp has sufficient power to very quickly heat the adhesive to its sag temperature, thus allowing the core to be continuously advanced through the reticulator at a uniform speed.

When the reticulator is operated in the manner just described, the downstream end of the core does not pass under the lamp or over the air knife, as it is originally positioned in the support roller assembly. If the adhesive is to be reticulated over the entire core, the roller support assembly can be repositioned on the upstream side of the lamp so that the entire core and overlying adhesive can be subjected to the reticulating process.

Figure 8:
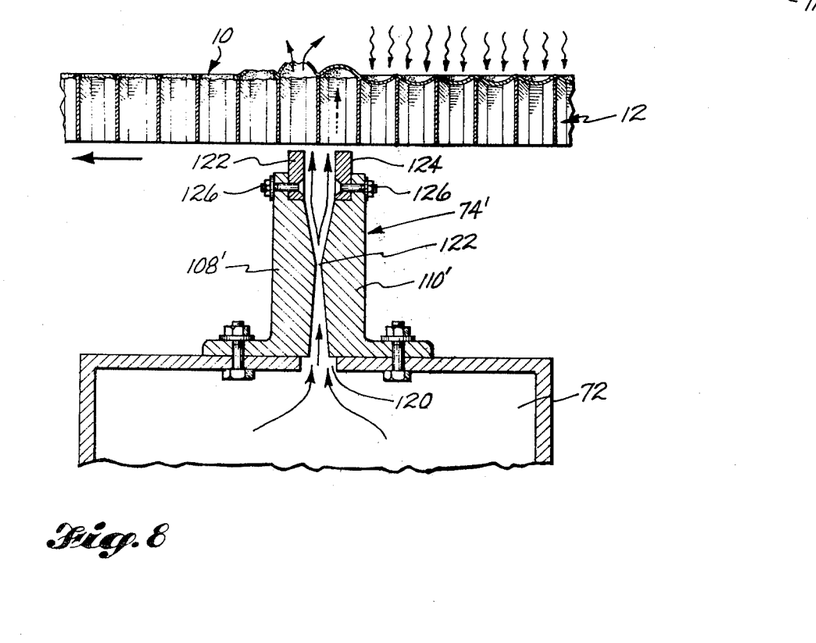
FIG. 8 is an enlarged, cross-sectional view of an improved nozzle for use with the air knife illustrated in FIGS. 6 and 7.

The configuration of the nozzle of the air knife 26 shown in FIGS. 6 and 7 may be unsatisfactory for some applications since low pressure gradients are formed along the longitudinal edges of the nozzle opening as the air exhauts from the nozzle. These pressure gradients tend to entrain cool ambient air in the air stream issuing from the nozzle. The ambient air cools the hot airstream exhausting from the nozzle and tends to alter the thermal efficiency of the reticulation process. To solve these problems, an improved weir has been developed. Referring to FIG. 9, the mutually opposing surfaces of the upright or vertical arms of the flanges 108' and 110' are reshaped so that, in cross section, a venturi-shaped nozzle is formed. The venturi-shaped nozzle 74' has a relatively wide lower opening 120 in fluid communication with the upper chamber of the plenum 72. The inner surfaces of the upright arms then converge from the lower opening to form a relatively narrow restricting section 122, and thereafter diverge upwardly to expand the compressed air traveling through the nozzle 74'. Air guides 122 and 124 are secured by suitable fasteners 126 to the upper ends of the upright arms of the flanges 108' and 110'. The guides 122 and 124 are located in recesses that are formed in the upper extremity of the internal, mutually opposing surfaces of the upright arms and that extend along the entire longitudinal dimension of the nozzle opening. The guides 122 and 124 have mutually opposing inner surfaces that form upward generally parallel extensions of the diverging surfaces of the nozzle 74'. The guides 122 and 124 terminate a very short distance below the location of the bottom surface of the honeycomb core 12.

The guides 122 and 124 are interchangeable on the nozzle so that the upwardly facing edge surfaces of the guides 122 and 124 can be constructed to conform to the shape of the bottom surface of the honeycomb core 12 as it passes over the air knife. For example, some honeycomb cores are curved in the direction in which they are advanced through the reticulating apparatus. Thus, if the bottom surface of the honeycomb core 12 is concave in section looking in the direction of FIG. 8, the upper edge surfaces of the guides 122 and 124 can be manufactured to have a generally convex shape to conform to the concave core structure. With this construction the guides can be positioned very closely to the bottom surface of the honeycomb core. Similarly, if the core is substantially straight in its traverse direction through the reticulator, but is simply or complexly curved in its transverse or width dimension, appropriately shaped guides can be substituted for the guides 122 and 124, so as to conform the nozzle opening to the core shape.

The present invention has been described in relation to a preferred embodiment of the method for reticulating an adhesive onto an apertured surface of a workpiece and in relation to a preferred embodiment of a reticulator for performing the method to reticulate an adhesive on the surface network of a honeycomb core. One of ordinary skill, after reading the foregoing specification will be able to make alterations, substitute equivalent structures and function, and make other changes in both the process and the apparatus without departing from the broad concepts disclosed herein. For example, the adhesive film covering a given aperture can be distended to form a bubble by the application of a suitable pressure differential between the outer surface of the film and the interior of the aperture. A suitable pressure differential can be achieved by covering the aperture with an adhesive film at atmospheric pressure and thereafter subjecting the region above the film to a vacuum, thereby causing the fluid pressure within the aperture to distend the film outwardly from the surface of the workpiece and to burst. It is therefore intended that the present invention be limited only by the definition contained in the appended claims.

What is claimed is:

1. A method for reticulating an adhesive on a discontinuous surface of a workpiece prior to adhering a second workpiece to said surface, said discontinuous surface including a plurality of orifices extending from said surface or said workpiece, said method comprising the steps of:
   (a) contacting said surface with a continuous film of adhesive so as to cover said surface and said orifices, said film of adhesive being characterized by a substantially uniform thickness, by a loss of cohesive strength upon heating, and by a tendency to contract when ruptured,
   (b) causing said film to adhere to at least a portion of said surface of said workpiece surrounding said orifices,
   (c) heating said film to a temperature lower than the melting temperature of said film to reduce the cohesive strength of said film, and, while maintaining the temperature of said film below the melting temperature of said film exerting a fluid pressure in said orifices to cause the portion of said film covering said orifices to distend outwardly away from said surface and to form bubbles, said fluid pressure being exerted until said bubbles rupture and said film contracts toward said surface to leave an adhesive bead on said surface adjacent the periphery of said orifices.

2. The method of claim 1 wherein said film comprises a thermosetting adhesive resin, and wherein said film is caused to adhere to said surface surrounding said apertures by heating said film to a temperature sufficiently high to cause said film to become tacky and adhere to said surface surrounding said orifices.

3. The method of claim 2 wherein said resin comprises an epoxy resin or a polyimide resin.

4. The method of claim 1 wherein said workpiece is a honeycomb core, said surface comprising the surface network formed by the edges of the cell walls of the honeycomb core.

5. The method of claim 1 wherein the portion of the surface of said workpiece being subjected to said fluid pressure exerting step and said heating step is supported in a substantially horizontal orientation, said film being heated to a temperature sufficient to cause said film covering said orifices to sag into said orifices, said fluid pressure being exerted by injecting a fluid stream into said orifice, said fluid stream being directed upwardly and outwardly from said surface of said workpiece so as to cause said film covering said apertures to distend outwardly and rupture.

6. A method for forming an adhesive bead on the surface of a workpiece surrounding an aperture in the surface of said workpiece and on the walls of the aperture contiguous to the surface of the workpiece, said adhesive bead being formed prior to adhering a second workpiece to said surface, said method comprising the steps of:
  (a) placing a self-supporting film of adhesive on said workpiece so as to cover said aperture and contact the surface of said workpiece surrounding said aperture, said film being characterized by a tendency to lose cohesive strength when heated, by a substantially uniform thickness, and by a tendency to contract when ruptured,
  (b) causing said film to at least partially adhere to said surface surrounding said aperture,
  (c) heating said film to a temperature lower than the melting temperature of said film to reduce the cohesive strength of said film, and while maintaining the temperature of said film below the melting temperature of said film injecting a fluid into said aperture in a direction so as to cause the portion of said film covering said aperture to distend outwardly from the surface of said workpiece and form a bubble, said fluid being injected until said bubble ruptures and said film contracts toward the periphery of said aperture to leave an adhesive bead surrounding said aperture.

7. The method of claim 6 wherein said workpiece contains a plurality of apertures and wherein said film of adhesive is placed on said workpiece so as to cover said plurality of apertures and to contact the surface of said workpiece surrounding said plurality of apertures.

8. The method of claim 6 wherein said resin comprises an epoxy resin or a polyimide resin.

9. The method of claim 5 wherein said workpiece is a honeycomb core, said surface comprising the surface network formed by the edges of the cell walls of the honeycomb core.

10. A method for reticulating an adhesive film to conform to the surface network formed by the edge surfaces of the cell walls of a honeycomb core comprising:
  (a) overlaying said surface network with a continuous adhesive film, said film being characterized by a tendency to lose its cohesive strength when heated, by a substantially uniform thickness, and by a tendency to contract when ruptured,
  (b) heating said adhesive film to a temperature lower than the melting temperature of said film over at least a portion of said surface network to cause said adhesive film to adhere to said surface network and to reduce the cohesive strength of said adhesive film, and
  (c) prior to placing a second workpiece on said surface for adherence thereto and after heating said adhesive film, injecting a fluid through the cells of said honeycomb core, while maintaining the temperature of said film below the melting temperature of said film, so as to cause the heated portion of said adhesive film covering said cells to distend outwardly away from said surface network to form bubbles over said cells, said fluid being injected until said bubbles rupture and said adhesive film contracts toward said surface network to leave a bead of adhesive covering said surface network and only the portion of the walls of said cells contiguous to said surface network.

11. The method of claim 10 wherein said adhesive film comprises an epoxy resin or a polyimide resin.

* * * * *

UNITED STATES PATENT AND TRADEMARK OFFICE
CERTIFICATE OF CORRECTION

PATENT NO. : 4,249,974
DATED : February 10, 1981
INVENTOR(S) : Paul H. Wilson

It is certified that error appears in the above-identified patent and that said Letters Patent are hereby corrected as shown below:

Column 7, line 57: "or" is changed to --on--.

Column 10, line 48: "and" is changed to --end--.

Column 10, line 63: "ccre" is changed to --core--.

Column 12, line 29: "or" is changed to --of--.

Column 12, line 60: "1" is changed to --3--.

Column 12, line 64: "1" is changed to --3--.

Signed and Sealed this

Twenty-eighth Day of July 1981

[SEAL]

Attest:

Attesting Officer

GERALD J. MOSSINGHOFF

Commissioner of Patents and Trademarks